US012738515B2

(12) United States Patent
Sonobe et al.

(10) Patent No.: US 12,738,515 B2
(45) Date of Patent: Sep. 15, 2026

(54) FUEL CELL SYSTEM AND METHOD FOR STOPPING POWER GENERATION IN FUEL CELL SYSTEM

(71) Applicant: HONDA MOTOR CO., LTD., Tokyo (JP)

(72) Inventors: Takuma Sonobe, Wako (JP); Ryoji Sakai, Wako (JP); Sho Akabori, Wako (JP); Takuto Nakagawa, Wako (JP)

(73) Assignee: Honda Motor Co. Ltd., Tokyo (JP)

( * ) Notice: Subject to any disclaimer, the term of this patent is extended or adjusted under 35 U.S.C. 154(b) by 640 days.

(21) Appl. No.: 18/072,915

(22) Filed: Dec. 1, 2022

(65) Prior Publication Data

US 2023/0178768 A1 Jun. 8, 2023

(30) Foreign Application Priority Data

Dec. 7, 2021 (JP) ................................ 2021-198402

(51) Int. Cl.
*H01M 8/04228* (2016.01)
*H01M 8/04225* (2016.01)
*H01M 8/04537* (2016.01)

(52) U.S. Cl.
CPC ... *H01M 8/04228* (2016.02); *H01M 8/04225* (2016.02); *H01M 8/04619* (2013.01); *H01M 2250/20* (2013.01)

(58) Field of Classification Search
CPC ......... H01M 8/04089; H01M 8/04201; H01M 8/04559; H01M 8/04619; H01M 16/006; H01M 2250/20
See application file for complete search history.

(56) References Cited

U.S. PATENT DOCUMENTS

2004/0101724 A1* 5/2004 Imamura ............. H01M 8/2457 429/432
2005/0130000 A1* 6/2005 Ojima ............... H01M 8/04992 429/432
2015/0075885 A1* 3/2015 Takasu .................... B60L 1/003 180/65.31

(Continued)

FOREIGN PATENT DOCUMENTS

CN 109786788 A 5/2019
JP 2004-186137 A 7/2004
JP 2008-004482 A 1/2008

(Continued)

OTHER PUBLICATIONS

JP20211052479 (Year: 2021).*

(Continued)

*Primary Examiner* — Brian R Ohara
*Assistant Examiner* — Brent C Thomas
(74) *Attorney, Agent, or Firm* — Carrier, Shende & Associates P.C.; Joseph P. Carrier; Jeffrey T. Gedeon

(57) ABSTRACT

A fuel cell system performs a first control of stopping power generation of a fuel cell stack by closing a supply-side stop valve during power generation of the fuel cell stack, and a second control of driving an air pump by using surplus power generated in a moving body to thereby discard the surplus power. If a closed state of the supply-side stop valve is detected when the first control and the second control start to be executed, the air pump is driven in a predetermined state.

8 Claims, 4 Drawing Sheets

(56) References Cited

U.S. PATENT DOCUMENTS

| | | | |
|---|---|---|---|
| 2017/0237094 | A1 | 8/2017 | Ojima et al. |
| 2019/0148747 | A1 | 5/2019 | Yamamori et al. |

FOREIGN PATENT DOCUMENTS

| | | | |
|---|---|---|---|
| JP | 2017-147022 | A | 8/2017 |
| JP | 2021-052479 | A | 4/2021 |

OTHER PUBLICATIONS

Machine translation of JP20211052479 (Year: 2021).*
JP2021 machine trans with paragraph numbers (Year: 2021).*
Office Action dated Aug. 15, 2023 issued in the corresponding Japanese Patent Application No. 2021-198402 with the English machine translation thereof.
Office Action and Search Report dated Nov. 18, 2025 issued in the corresponding Chinese Patent Application No. 202211532042.0 with the English machine translation thereof.

* cited by examiner

12
TANK
MOTOR
INV
BATVCU
FCVCU
BATTERY
INV
FUEL CELL STACK
HUMIDIFIER
AIR PUMP
AFS
COOLANT PUMP
RADIATOR
POWER SW
ECU
TO EACH COMPONENT

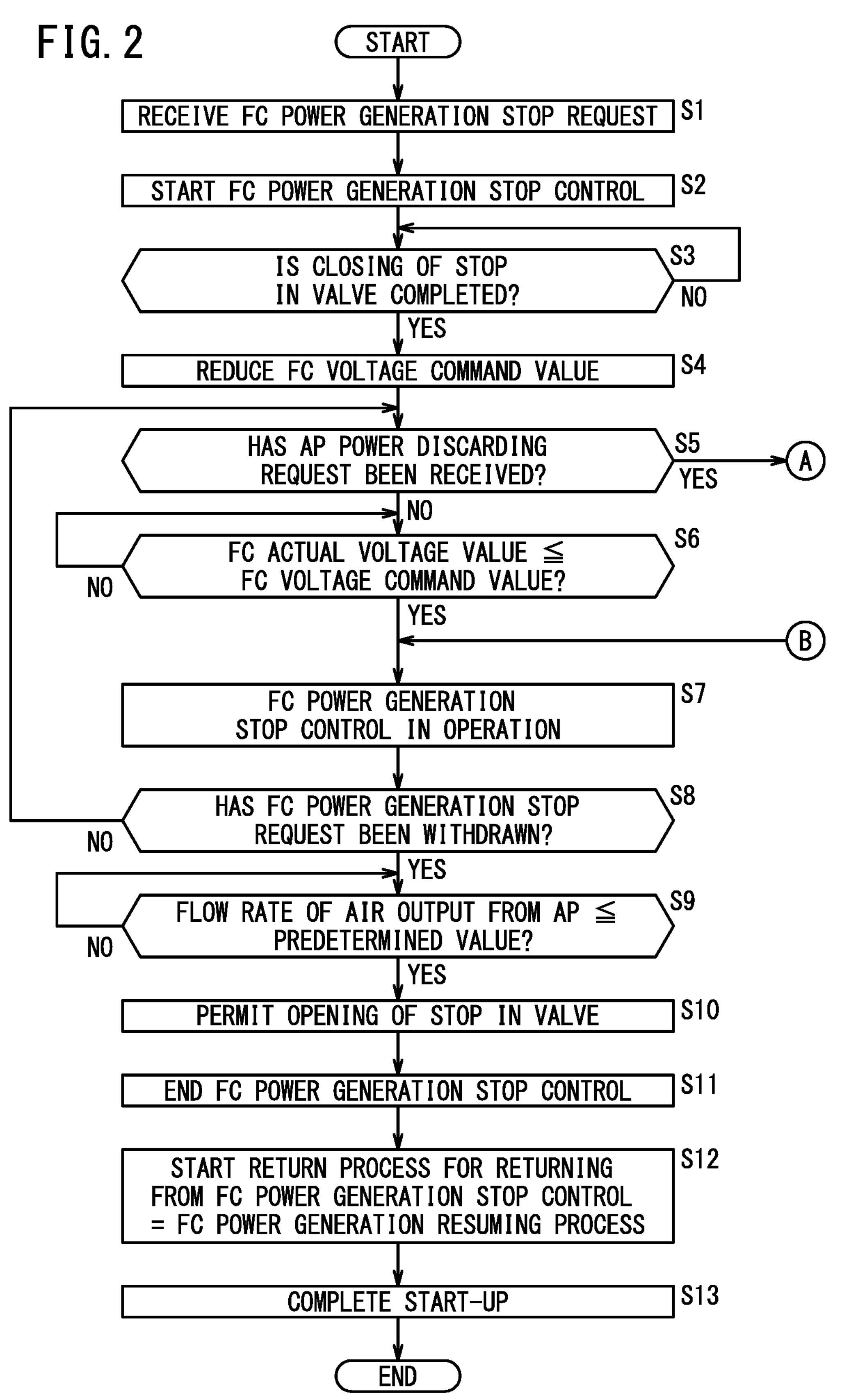
FIG. 2
START
RECEIVE FC POWER GENERATION STOP REQUEST
S1
START FC POWER GENERATION STOP CONTROL
S2
IS CLOSING OF STOP IN VALVE COMPLETED?
S3
NO
YES
REDUCE FC VOLTAGE COMMAND VALUE
S4
HAS AP POWER DISCARDING REQUEST BEEN RECEIVED?
S5
YES
A
NO
FC ACTUAL VOLTAGE VALUE ≦ FC VOLTAGE COMMAND VALUE?
S6
NO
YES
B
FC POWER GENERATION STOP CONTROL IN OPERATION
S7
HAS FC POWER GENERATION STOP REQUEST BEEN WITHDRAWN?
S8
NO
YES
FLOW RATE OF AIR OUTPUT FROM AP ≦ PREDETERMINED VALUE?
S9
NO
YES
PERMIT OPENING OF STOP IN VALVE
S10
END FC POWER GENERATION STOP CONTROL
S11
START RETURN PROCESS FOR RETURNING FROM FC POWER GENERATION STOP CONTROL = FC POWER GENERATION RESUMING PROCESS
S12
COMPLETE START-UP
S13
END

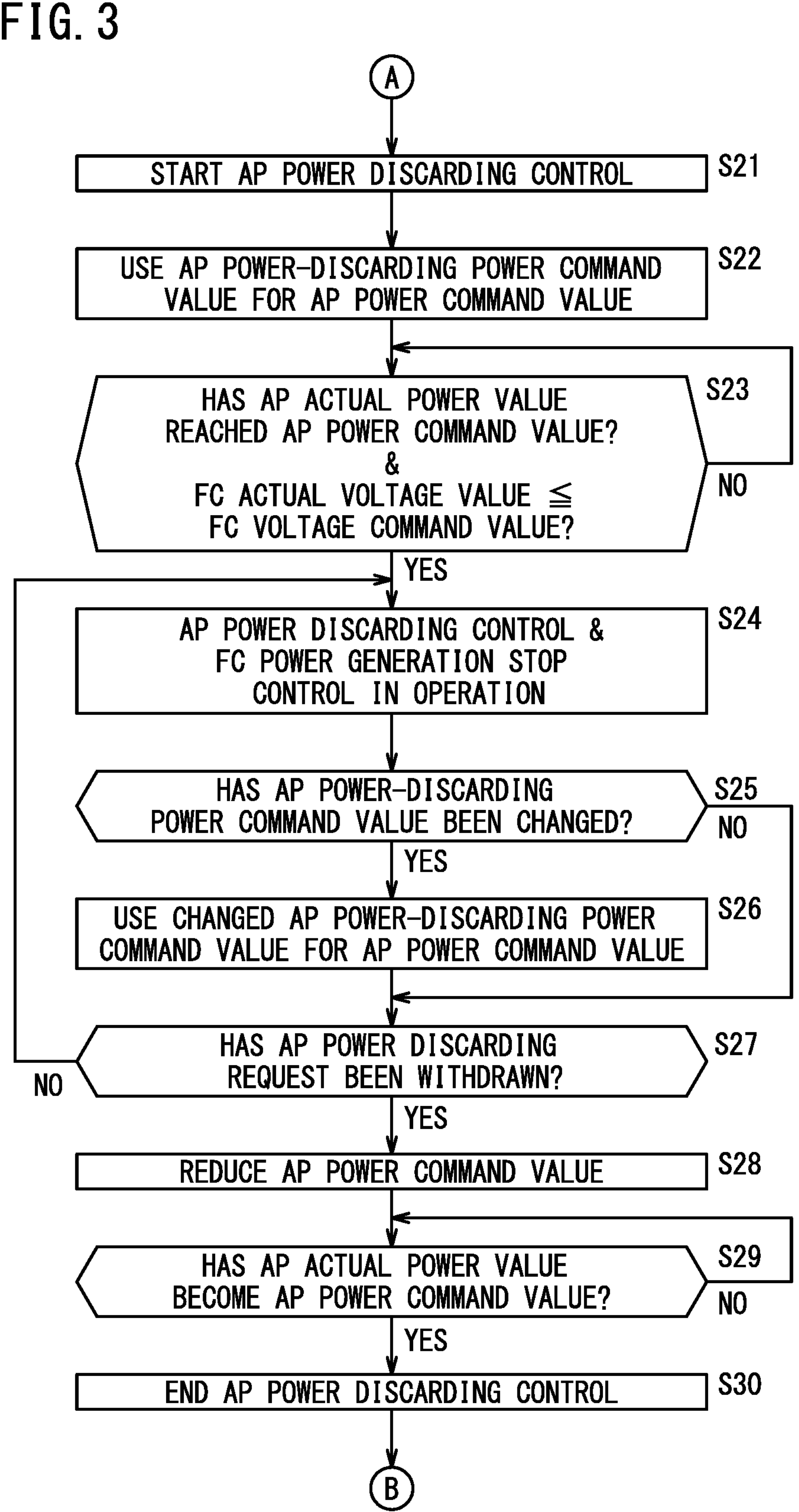
FIG. 3
A
START AP POWER DISCARDING CONTROL
S21
USE AP POWER-DISCARDING POWER COMMAND VALUE FOR AP POWER COMMAND VALUE
S22
HAS AP ACTUAL POWER VALUE REACHED AP POWER COMMAND VALUE? & FC ACTUAL VOLTAGE VALUE ≦ FC VOLTAGE COMMAND VALUE?
S23
NO
YES
AP POWER DISCARDING CONTROL & FC POWER GENERATION STOP CONTROL IN OPERATION
S24
HAS AP POWER-DISCARDING POWER COMMAND VALUE BEEN CHANGED?
S25
NO
YES
USE CHANGED AP POWER-DISCARDING POWER COMMAND VALUE FOR AP POWER COMMAND VALUE
S26
HAS AP POWER DISCARDING REQUEST BEEN WITHDRAWN?
S27
NO
YES
REDUCE AP POWER COMMAND VALUE
S28
HAS AP ACTUAL POWER VALUE BECOME AP POWER COMMAND VALUE?
S29
NO
YES
END AP POWER DISCARDING CONTROL
S30
B

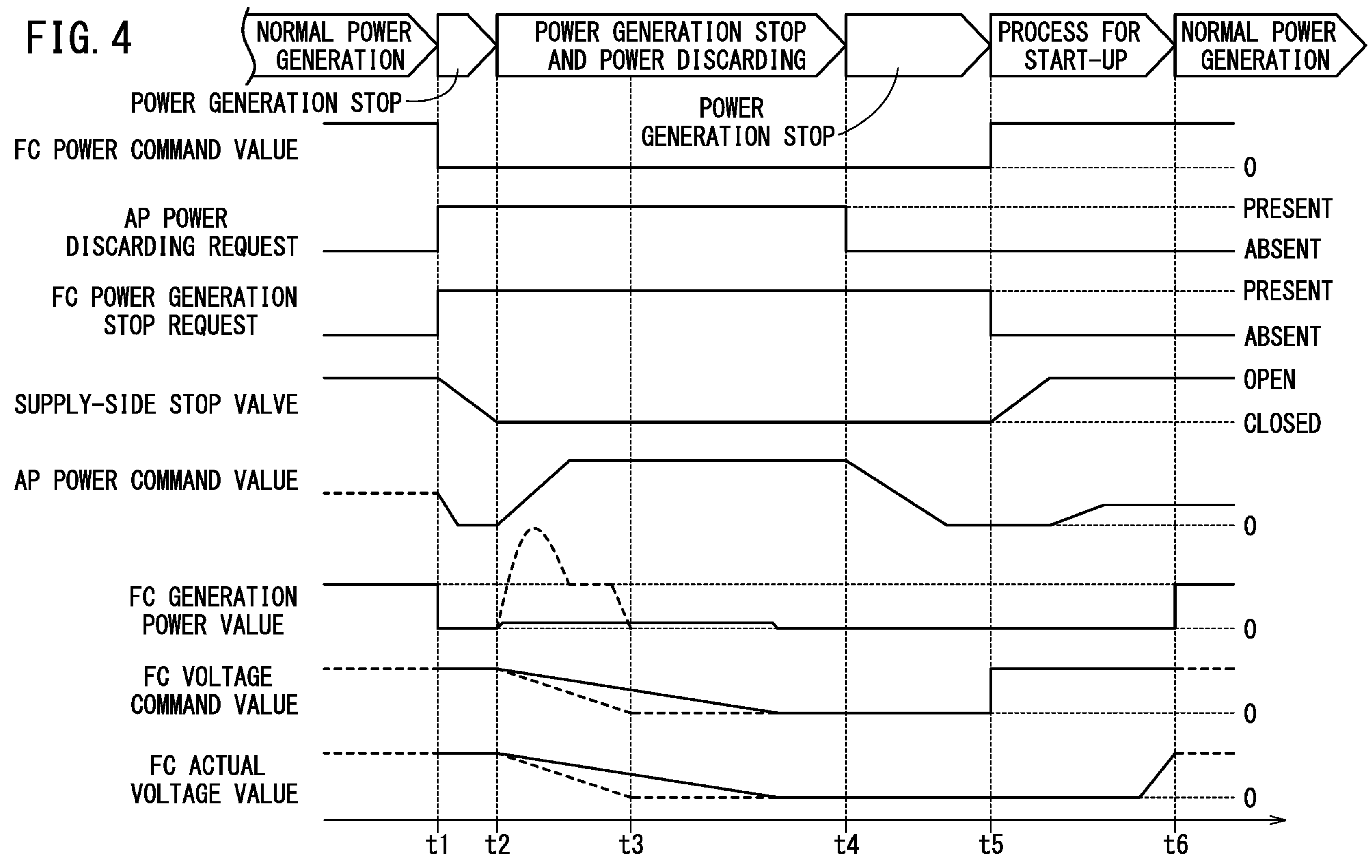
FIG. 4
NORMAL POWER GENERATION
POWER GENERATION STOP AND POWER DISCARDING
PROCESS FOR START-UP
NORMAL POWER GENERATION
POWER GENERATION STOP
POWER GENERATION STOP
FC POWER COMMAND VALUE
AP POWER DISCARDING REQUEST
FC POWER GENERATION STOP REQUEST
SUPPLY-SIDE STOP VALVE
AP POWER COMMAND VALUE
FC GENERATION POWER VALUE
FC VOLTAGE COMMAND VALUE
FC ACTUAL VOLTAGE VALUE
0
PRESENT
ABSENT
PRESENT
ABSENT
OPEN
CLOSED
0
0
0
0
t1
t2
t3
t4
t5
t6

FUEL CELL SYSTEM AND METHOD FOR STOPPING POWER GENERATION IN FUEL CELL SYSTEM

CROSS-REFERENCE TO RELATED APPLICATIONS

This application is based upon and claims the benefit of priority from Japanese Patent Application No. 2021-198402 filed on Dec. 7, 2021, the contents of which are incorporated herein by reference.

BACKGROUND OF THE INVENTION

Field of the Invention

The present invention relates to a fuel cell system provided in a moving body and a method for stopping power generation in the fuel cell system.

Description of the Related Art

In recent years, instead of gasoline vehicles, fuel cell vehicles (FCV) using hydrogen as fuel have attracted attention as environment-friendly vehicles. The fuel cell vehicle supplies air (including oxygen) and hydrogen gas as a fuel gas to a fuel cell. The fuel cell vehicle travels by driving an electric motor using electricity generated by the fuel cell. For this reason, unlike gasoline vehicles, the fuel cell vehicles do not discharge carbon dioxide (CO2), NOx, SOx, and the like, but discharge only water, so that the fuel cell vehicles are regarded as environmentally friendly vehicles.

For example, JP 2017-147022 A describes a technique related to a fuel cell system applicable to a moving body such as a fuel cell vehicle.

This technique monitors the temperature in the fuel cell system when power generation by the fuel cell stack is stopped in a state in which the power switch of the fuel cell vehicle is in an OFF state. When freezing in the fuel cell system is predicted, a stop valve in the cathode path is opened and operation of the air pump is started. Air is caused to flow through the cathode path of the fuel cell system, and moisture (water) in the cathode path is discharged to the outside. Thus, freezing of the fuel cell system is prevented.

SUMMARY OF THE INVENTION

There are cases where the fuel cell system may receive a power generation stop request of the fuel cell stack when the fuel cell vehicle is running or idling (idling power generation is being performed) in a state in which the power switch of the fuel cell vehicle is in an ON state. If air for preventing freezing is circulated in the fuel cell system every time the power generation stop request is received, deterioration of the power generation cell (electrolyte membrane) progresses, and durability of the fuel cell stack decreases.

On the other hand, when the fuel cell system receives the power generation stop request, the fuel cell system closes the stop valve in the cathode path and lowers the output command value for the fuel cell stack. At this time, if the output command value is rapidly lowered, a transient current occurs in the fuel cell stack. There is a possibility that unintended power generation is performed. Inversely, if the output command value for the fuel cell stack is slowly lowered such that such a transient current does not occur, it takes time for the fuel cell stack to stop power generation.

An object of the present invention is to solve the aforementioned problem.

In order to achieve the above object, according to a first aspect of the present invention, there is provided a fuel cell system provided in a moving body, including: a fuel cell stack; a cathode supply path through which an oxygen-containing gas is supplied to the fuel cell stack; an air pump configured to supply the oxygen-containing gas to the cathode supply path; a stop valve provided between the air pump and the fuel cell stack in the cathode supply path; and a control device configured to execute a first control of stopping power generation of the fuel cell stack by closing the stop valve during power generation of the fuel cell stack, and a second control of discarding surplus electric power generated in the moving body by driving the air pump by the surplus electric power, wherein when starting to execute the first control and the second control, if a closed state of the stop valve is detected, the control device drives the air pump in a predetermined state.

In order to achieve the above object, according to a second aspect of the present invention, there is provided a method for stopping power generation of a fuel cell system provided in a moving body, wherein the fuel cell system includes: a fuel cell stack; a cathode supply path through which an oxygen-containing gas is supplied to the fuel cell stack; an air pump configured to supply the oxygen-containing gas to the cathode supply path; and a stop valve provided between the air pump and the fuel cell stack in the cathode supply path, the method including: a first step of causing the stop valve to be closed during power generation of the fuel cell stack; a second step of detecting a closed state of the stop valve after the first step; and a third step of driving the air pump in a predetermined state by surplus electric power generated in the moving body after the closed state of the stop valve is detected in the second step.

According to the present invention, when the closed state of the stop valve is detected at the time of stopping the power generation of the fuel cell stack, the fuel cell system drives the air pump in the predetermined state to thereby consume (discard) the surplus power of the moving body through driving of the air pump. Therefore, for example, even when transient electric power occurs in the fuel cell stack after the stop valve is closed, surplus electric power of the moving body including such transient electric power can be consumed by the air pump (discarded through driving of the air pump). Thus, the entire moving body including the fuel cell system can be quickly shifted to the power generation stop state.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a flowchart used for explaining power generation stop control executed by the fuel cell system;

FIG. 3 is a flowchart used for explaining a power discarding control executed by the fuel cell system; and FIG. 4 is a timing chart illustrating an example of a case where both the power generation stop control and the power discarding control are executed.

DESCRIPTION OF THE INVENTION

Figure 1:
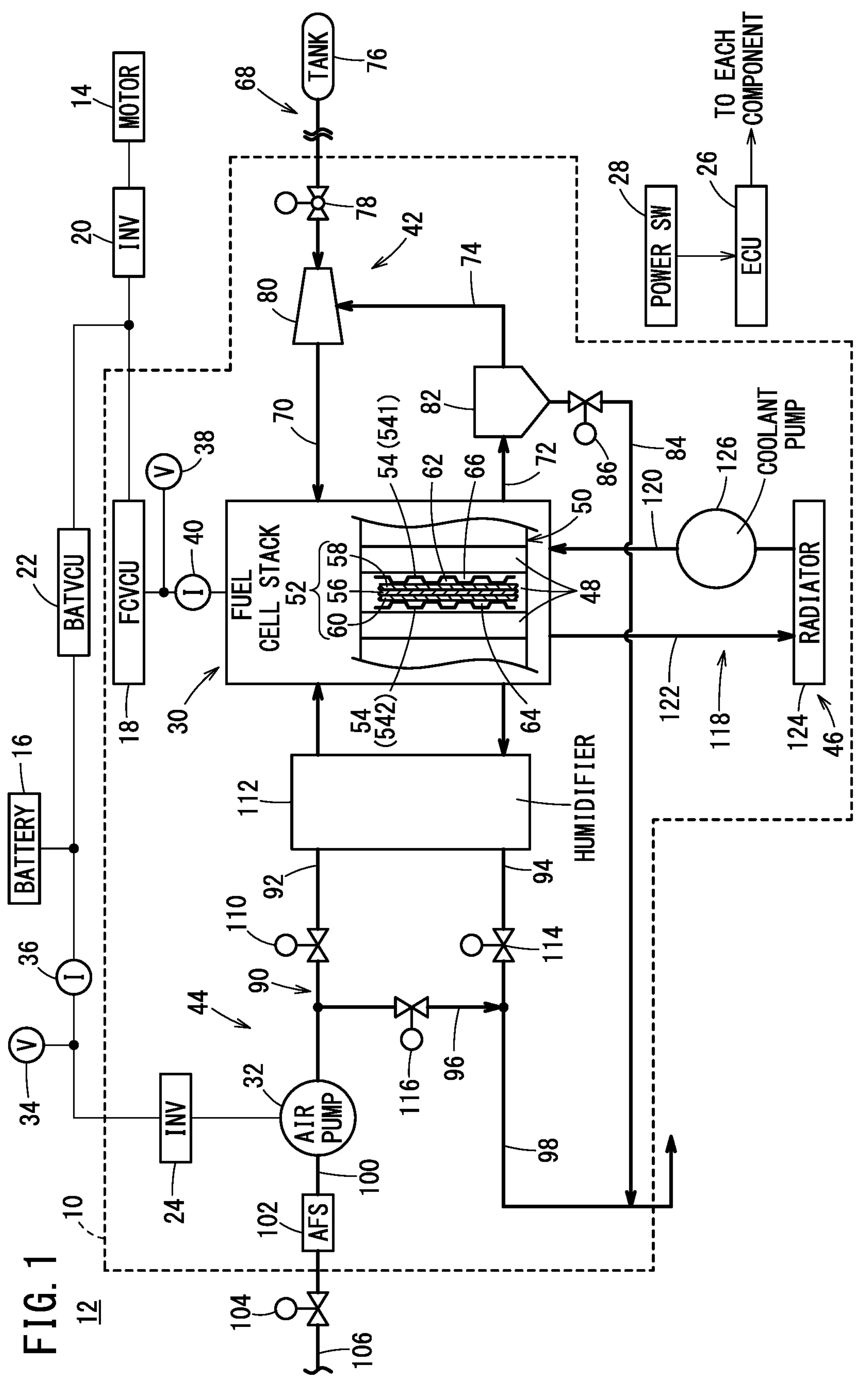
FIG. 1 is a block diagram showing an example of a configuration of a moving body equipped with a fuel cell system according to an embodiment of the present invention.

FIG. 1 is a block diagram showing an example of a configuration of a moving body 12 equipped with a fuel cell system 10 according to an embodiment of the present invention.

As shown in FIG. 1, the moving body 12 is, for example, a fuel cell vehicle (fuel cell electric vehicle) that travels by a driving force of a motor (electric motor) 14. However, the moving body 12 on which the fuel cell system 10 is mounted is not limited to a fuel cell vehicle, and may be another vehicle, a ship, an aircraft, a robot, or the like.

In addition to the fuel cell system 10, the moving body 12 includes a battery 16 that is an energy storage device, a boost converter (FCVCU: fuel cell voltage control unit) 18, an inverter (a driving device of rotary electric machine) 20, and a motor (an electric motor for driving a vehicle) 14. In addition, the moving body 12 includes a boost/buck (bidirectional) converter (BATVCU: battery voltage control unit) 22, an inverter (a driving device for an auxiliary device such as an air pump 32) 24, a control device (ECU) 26, and a power switch (power SW) 28.

The ECU 26 is configured by an electronic control unit. A central processing unit (CPU) inside the ECU 26 executes a program stored in a memory. As a result, the ECU 26 operates as various functional control units such as a power generation control unit, etc. The ECU 26 integrally controls the components of the moving body 12 including the fuel cell system 10 through control lines (not shown). Note that the control lines include not only a form of wired communication but also a form of wireless communication.

The output of the fuel cell system 10 is the generation power (FC generation power) of the fuel cell stack 30. The generation power (generated electric energy) of the fuel cell stack 30 is supplied to the motor 14 through the boost converter 18 and the inverter 20 under the control of the ECU 26.

The battery 16 can be charged with generation power of the fuel cell stack 30 through the boost converter 18 and the boost/buck converter 22. In this case, the boost/buck converter 22 functions as a buck converter.

The electric power supplied from the battery 16 can drive the motor 14 through the boost/buck converter 22 and the inverter 20, for example, when the moving body 12 is activated (started) by the power switch 28 transitioning from an OFF state to an ON state. Further, the electric power supplied from the battery 16 can drive the motor 14 through the boost/buck converter 22 and the inverter 20 at the time of acceleration caused by an accelerator operation during traveling of the moving body 12. In this case, the boost/buck converter 22 functions as a boost converter.

Regenerative electric power of the motor 14 generated during deceleration is supplied to the battery 16 through the inverter 20 and the boost/buck converter 22 for charging. In this case, the boost/buck converter 22 functions as a buck converter.

Regenerative electric power of the motor 14 generated during deceleration can drive an air pump (AP, air compressor) 32 through the inverter 20, the boost/buck converter 22, and the inverter 24.

Further, the electric power supplied from the battery 16 can drive the air pump 32 through the inverter 24.

The ECU 26 calculates the electric power supplied to the air pump 32, based on the voltage value of a voltmeter 34 and the current value of an ammeter 36. Further, the ECU 26 calculates the generation power (FC generation power value) of the fuel cell stack 30, based on the voltage value of a voltmeter 38 and the current value of an ammeter 40.

The fuel cell system 10 includes a fuel cell stack (fuel cells) 30, an anode system apparatus 42, a cathode system apparatus 44, and a cooling apparatus 46. The fuel cell system 10 supplies generation power generated by the fuel cell stack 30 to the motor 14, the battery 16, the air pump 32, and the like.

The fuel cell stack 30 includes a stack body 50 having a plurality of power generation cells 48 stacked together, which is accommodated in a stack case (not shown). Each power generation cell 48 generates electric power by an electrochemical reaction between a fuel gas such as hydrogen and an oxygen-containing gas such as air.

Each of the power generation cells 48 includes a membrane electrode assembly 52 and a pair of separators 54 (541, 542) holding and sandwiching the membrane electrode assembly 52 therebetween. Hereinafter, the membrane electrode assembly 52 is referred to as a "MEA52".

The MEA 52 includes an electrolyte membrane 56, an anode 58 provided on one side surface of the electrolyte membrane 56, and a cathode 60 provided on another side surface of the electrolyte membrane 56. The electrolyte membrane 56, for example, is a solid polymer electrolyte membrane (cation ion exchange membrane).

The separator 541 includes an anode flow field (fuel gas flow field) 62 through which the fuel gas flows. The separator 542 includes a cathode flow field (oxygen-containing gas flow field) 64 through which the oxygen-containing gas flows. The plurality of power generation cells 48 are stacked together, whereby a coolant flow field 66 through which a coolant flows is formed between the surface of the separator 541 and the surface of the separator 542 that face each other.

Furthermore, each power generation cell 48 includes a plurality of passages (not shown) (fuel gas passages, oxygen-containing gas passages, and coolant passages). Of these passages, the fuel gas passages are connected to the anode flow field 62. The oxygen-containing gas passages are connected to the cathode flow field 64, and the coolant passages are connected to the coolant flow field 66. The fuel gas, the oxygen-containing gas, and the coolant flow into the respective flow field through the passages and flow in the stacking direction of the stack body 50.

A fuel gas is supplied to the fuel cell stack 30 by the anode system apparatus 42. In the fuel cell stack 30, the fuel gas flows through the fuel gas passage (fuel gas supply passage) and flows into the anode flow field 62. The fuel gas is used for power generation at the anode 58. The fuel exhaust gas (anode off-gas) used for power generation flows from the anode flow field 62 to the fuel gas passage (fuel gas discharge passage), and is discharged from the fuel cell stack 30 to the anode system apparatus 42. The anode off-gas contains unreacted hydrogen.

The oxygen-containing gas is supplied to the fuel cell stack 30 by the cathode system apparatus 44. In the fuel cell stack 30, the oxygen-containing gas flows through the oxygen-containing gas passage (oxygen-containing gas supply passage) and flows into the cathode flow field 64. The oxygen-containing gas is used for power generation at the cathode 60. The oxygen-containing exhaust gas (cathode off-gas) used for power generation flows from the cathode flow field 64 to the oxygen-containing gas passage (oxygen-containing gas discharge passage), and is discharged from the fuel cell stack 30 to the cathode system apparatus 44.

Further, the coolant is supplied to the fuel cell stack 30 by the cooling apparatus 46. In the fuel cell stack 30, the coolant flows through the coolant passage (coolant supply passage) and flows into the coolant flow field 66. The coolant cools the power generation cells 48. The coolant that has cooled the power generation cells 48 flows out from the coolant flow field 66 to the coolant passage (coolant discharge passage), and is discharged from the fuel cell stack 30 to the cooling apparatus 46.

The anode system apparatus 42 of the fuel cell system 10 has an anode path 68. The anode path 68 includes an anode supply path 70 and an anode discharge path 72. The anode supply path 70 supplies fuel gas to the fuel cell stack 30, and the anode discharge path 72 discharges anode off-gas from the fuel cell stack 30.

The anode path 68 includes an anode circulation path 74. The anode circulation path 74 causes unreacted hydrogen contained in the anode off-gas to flow from the anode discharge path 72 to the anode supply path 70. One end of a bleed path (not shown) may be connected to the anode circulation path 74. The bleed path (not shown) causes part of the anode off-gas to flow from the circulation circuit of the anode system apparatus 42 to the cathode system apparatus 44.

A tank 76 is provided on the upstream side of the anode supply path 70. The tank 76 stores the fuel gas. The anode supply path 70 is provided with an injector 78 and an ejector 80, which are arranged in this order toward the downstream side in the flow direction of the fuel gas.

The injector 78 performs opening/closing operation during power generation of the fuel cell system 10. The injector 78 makes the pressure of the fuel gas lower than that on the tank 76 side, and discharges the low-pressure fuel gas to the downstream side.

The ejector 80 supplies the fuel gas discharged from the injector 78, to the fuel cell stack 30. The flow of the fuel gas discharged from the injector 78 generates a negative pressure. The ejector 80 uses this negative pressure to suction the anode off-gas from the anode circulation path 74. The ejector 80 supplies also the anode off-gas suctioned from the anode circulation path 74 to the fuel cell stack 30.

The anode discharge path 72 is provided with a gas-liquid separator 82. The gas-liquid separator 82 separates liquid water (water produced during power generation) contained in the anode off-gas from the anode off-gas. The anode circulation path 74 is connected to an upper portion of the gas-liquid separator 82. The anode off-gas (gas) containing no liquid water flows through the anode circulation path 74. One end of a drain path 84 is connected to a bottom of the gas-liquid separator 82. The drain path 84 is provided with a drain valve 86 that opens and closes the path. When the drain valve 86 is opened, liquid water separated from the anode off-gas is discharged to the drain path 84.

The cathode system apparatus 44 of the fuel cell system 10 has a cathode path 90. The cathode path 90 includes a cathode supply path 92 and a cathode discharge path 94. The cathode supply path 92 supplies the oxygen-containing gas to the fuel cell stack 30, and the cathode discharge path 94 discharges the oxygen-containing exhaust gas from the fuel cell stack 30.

A cathode bypass passage 96 is connected between the cathode supply path 92 and the cathode discharge path 94. The cathode bypass passage 96 allows the oxygen-containing gas to flow from the cathode supply path 92 to the discharge path 98. The oxygen-containing gas is discharged to the outside of the fuel cell system 10 through the discharge path 98.

The air pump 32 is connected to the cathode supply path 92. The air pump 32 supplies the oxygen-containing gas to the fuel cell stack 30. The air pump 32 compresses air (outside air) on the upstream side of the air pump 32 by rotating a fan (not shown) and supplies the compressed air to the cathode supply path 92 on the downstream side. The air pump 32 according to the present embodiment is a shaft-levitation type (air bearing type) air pump that separates a fan from a peripheral wall surrounding the periphery of the fan during rotation of the fan. The air pump 32 includes an air pump rotation speed sensor (not shown).

The intake side of the air pump 32 communicates with the atmosphere through a conduit 100, an air flow sensor (AFS, mass flow sensor) 102, a shutoff valve 104, and a conduit 106. The discharge side of the air pump 32 communicates with the cathode supply path 92.

The air flow sensor 102 measures a mass flow rate M [g/min] of the oxygen-containing gas supplied from the air pump 32 to the fuel cell stack 30 via the cathode supply path 92. The air flow sensor 102 outputs the measurement result to the ECU 26.

The cathode supply path 92 includes a supply-side stop valve (stop IN valve) 110 on the downstream side of the connection point with the cathode bypass passage 96. The cathode supply path 92 includes a humidifier 112 between the supply-side stop valve 110 and the fuel cell stack 30. Although not shown, the cathode supply path 92 may be provided with an auxiliary device such as an intercooler for cooling the oxygen-containing gas. The other end of a bleed path (not shown) may be connected to the cathode supply path 92 on the downstream side of the humidifier 112. A gas-liquid separator (not shown) is preferably provided at a connection point between the cathode supply path 92 and the bleed path.

The humidifier 112 is provided so as to straddle both the cathode supply path 92 and the cathode discharge path 94. The oxygen-containing exhaust gas is discharged from the fuel cell stack 30 to the cathode discharge path 94. The oxygen-containing exhaust gas discharged from the fuel cell stack 30 contains moisture (water generated during power generation). The humidifier 112 humidifies the oxygen-containing gas flowing through the cathode supply path 92 by using the moisture (water generated during power generation).

The cathode discharge path 94 includes a discharge-side stop valve (stop OUT valve) 114 between the humidifier 112 and the cathode bypass passage 96. The discharge path 98 is connected to the cathode discharge path 94 on the downstream side of the cathode bypass passage 96. The discharge path 98 discharges the oxygen-containing exhaust gas to the outside of the fuel cell system 10. The other end of the drain path 84 of the anode system apparatus 42 is connected to the discharge path 98.

The cathode bypass passage 96 is provided with a bypass valve 116. The bypass valve 116 adjusts the flow rate of the oxygen-containing gas bypassing the fuel cell stack 30.

In the present embodiment, the supply-side stop valve 110 and the discharge-side stop valve 114 that open and close the cathode path 90 are butterfly valves whose opening degrees are linearly adjustable. Similarly, the bypass valve 116 is also a butterfly valve whose opening degree is linearly adjustable. The supply-side stop valve 110 and the discharge-side stop valve 114 may be valves that switch between ON (opening degree: 100%) and OFF (opening degree: 0%), such as solenoid valves.

The cooling apparatus 46 of the fuel cell system 10 includes a coolant path 118 through which a coolant flows. The coolant path 118 includes a coolant supply path 120 and a coolant discharge path 122. The coolant supply path 120 supplies the coolant to the fuel cell stack 30, and the coolant discharge path 122 discharges the coolant from the fuel cell stack 30. A radiator 124 is connected to the coolant supply path 120 and the coolant discharge path 122. The radiator 124 cools the coolant. The coolant supply path 120 is provided with a coolant pump 126. The coolant pump 126 circulates the coolant in the coolant circulation circuit. The coolant circulation circuit includes the coolant supply path 120, the fuel cell stack 30, the coolant discharge path 122, and the radiator 124.

Each component of the fuel cell system 10 described above is integrally controlled by the ECU 26 (Electronic Control Unit). As described above, the ECU 26 is configured by a computer including one or more processors, a memory, an input/output interface, and an electronic circuit. The one or more processors execute a program (not illustrated) stored in the memory. Thus, the ECU 26 controls the operations of the air pump 32, the supply-side stop valve 110, the discharge-side stop valve 114, the bypass valve 116, and the like.

In addition, the ECU 26 according to the present embodiment performs, during the operation of the moving body 12, a first control of stopping the power generation of the fuel cell stack 30 and a second control of consuming (discarding) surplus power (surplus electric power) of the moving body 12 by driving the air pump 32 by the surplus power. Hereinafter, the first control is referred to as a power generation stop control, and the second control is referred to as a power discarding control.

The term "during the operation of the moving body 12" means a state in which the power switch 28 of the moving body 12 is in an ON state. During the operation of the moving body 12, the moving body 12 is traveling or idling (i.e., the fuel cell system 10 is performing "idling power generation"), and the fuel cell stack 30 normally generates power.

The fuel cell system 10 according to the present embodiment is basically configured as described above. The operation will be described below with reference to the flowcharts of FIGS. 2 and 3.

Here, a state in which the moving body 12 is in operation will be described as an initial state. That is, a state in which the moving body 12 is traveling or idling (i.e., the fuel cell system 10 is performing "idling power generation") in a state of the power switch 28 of the moving body 12 being in an ON state, and the fuel cell stack 30 is performing power generation, will be described as an initial state.

Prior to step S10, the ECU 26 of the fuel cell system 10 receives, from another ECU mounted on the moving body 12, a request for setting the generation power of the fuel cell stack 30 to be 0 [kW]. In other words, the ECU 26 receives the FC power command value of 0 [kW]. In addition, the ECU 26 receives, from another ECU mounted on the moving body 12, a request for consuming the surplus power generated in the moving body 12 by driving the air pump 32. This request is hereinafter referred to as an AP power discarding request. Examples of the other ECUs include a travel control ECU (not shown) that controls the motor 14 and a battery ECU (not shown) that monitors the remaining battery level of the battery 16.

Immediately after receiving the FC power command value and the AP power discarding request, in step S1, the ECU 26 receives a signal requesting stopping of power generation of the fuel cell stack 30, from another ECU mounted on the moving body 12. This signal is hereinafter referred to as an "FC power generation stop request". The other ECUs are, for example, a travel control ECU (not shown) and a battery ECU (not shown). It should be noted that the ECU 26 may have functions of the travel control ECU, the battery ECU, and the like. Alternatively, the ECU 26 itself may generate the FC power generation stop request based on signals of various sensors (an accelerator opening sensor, a vehicle speed sensor, and the like) mounted on the moving body 12.

Upon receiving the FC power generation stop request, the ECU 26 starts power generation stop control (FC power generation stop control) of the fuel cell stack 30 in step S2.

To be specific, the ECU 26 instructs the supply-side stop valve 110 of the cathode supply path 92 to be fully closed (opening degree: 0%). Further, the ECU 26 instructs the discharge-side stop valve 114 of the cathode discharge path 94 to be fully closed (opening degree: 0%). On the other hand, the ECU 26 instructs the bypass valve 116 of the cathode bypass passage 96 to be fully opened (opening degree: 100%).

Next, in step S3, the ECU 26 detects the opening degree (closed state) of the supply-side stop valve (stop IN valve) 110. Then, the EUC 26 determines whether the closing of the valve has been completed. That is, the EUC 26 determines whether or not the opening degree of the supply-side stop valve 110 has reached 0%.

When it is determined that the supply-side stop valve 110 has been closed (step S3: YES), the process proceeds to step S4. In step S4, the ECU 26 starts to reduce the voltage command value (FC voltage command value) of the fuel cell stack 30.

At this time, closing of the supply-side stop valve 110 and the discharge-side stop valve 114 has been completed. Further, opening of the bypass valve 116 has been completed. Therefore, the oxygen-containing gas supplied to the downstream side of the air pump 32 does not flow toward the fuel cell stack 30 but flows from the cathode supply path 92 to the discharge path 98 through the cathode bypass passage 96.

On the other hand, the ECU 26 continuously supplies the fuel gas from the anode system apparatus 42 to the fuel cell stack 30. As a result, residual oxygen (residual oxygen-containing gas) inside the fuel cell stack 30 (the cathode flow field 64 and the like) and inside the pipes is consumed. That is, the residual oxygen in the oxygen-containing gas is consumed by the reaction between the fuel gas and the oxygen-containing gas in the fuel cell stack 30. As a result, the generation power generated by the fuel cell stack 30 gradually decreases. By continuing the supply of the fuel gas, when the fuel cell stack 30 returns to the normal power generation after the execution of the power generation stop control, the shortage of the supply of the fuel gas to the fuel cell stack 30 is avoided.

Next, in step S5, the ECU 26 checks whether the ECU 26 has received the AP power discarding request from another ECU mounted on the moving body 12. As described above, the AP power discarding request is a signal for requesting to consume the surplus power of the moving body 12 by driving the air pump 32.

Here, the other ECUs are, for example, the travel control ECU (not shown) and the battery ECU (not shown) as described above. It should be noted that the ECU 26 may have functions of the travel control ECU, the battery ECU, and the like. In addition, the ECU 26 itself may generate the AP power discarding request based on signals from various sensors (an accelerator opening sensor, a vehicle speed sensor, and the like).

Further, in step S5, the ECU 26 may change the degree of reduction in the FC voltage command value (the amount of reduction per unit time) depending on whether or not the AP power discarding request has been received. For example, when the ECU 26 has not received the AP power discarding request (step S5: NO), the ECU 26 may slowly reduce the FC voltage command value. Further, when the ECU 26 has received the AP power discarding request (step S5: YES), the ECU 26 may quickly reduce the FC voltage command value.

In step S5, when the ECU 26 has not received the AP power discarding request or when the AP power discarding request has been withdrawn (step S5: NO), the process proceeds to step S6.

In step S6, the ECU 26 calculates the voltage (FC actual voltage value) of the fuel cell stack 30 from the detection value of the voltmeter 38. Then, the ECU 26 determines whether or not the FC actual voltage value is equal to or less than the FC voltage command value (i.e., whether the FC actual voltage value the FC voltage command value). When it is determined that the FC actual voltage value is equal to or less than the FC voltage command value (step S6: YES), the process proceeds to step S7. In step S7, the ECU 26 executes only the power generation stop control.

On the other hand, in step S5, when the ECU 26 has received the AP power discarding request from another ECU (step S5: YES), the process proceeds to step S21 in FIG. 3.

As shown in FIG. 3, in step S21, the ECU 26 starts the power discarding control (which will be hereinafter also referred to as an AP power discarding control). When the power discarding control is started, the ECU 26 supplies surplus power generated in the moving body 12 to the air pump 32 and starts driving the air pump 32.

Here, a generation source of the surplus power generated in the moving body 12 is, for example, the motor 14, the battery 16, or the fuel cell stack 30. The surplus power generated in the moving body 12 is, for example, regenerative power of the motor 14 or power supplied from the battery 16. In addition, the surplus power generated in the moving body 12 is power generated from the fuel cell stack 30 during a period from the start of the power generation stop control of the fuel cell stack 30 to the end of the power generation stop control.

In the power discarding control, the ECU 26 supplies, to the air pump 32, either one of surplus power generated by an external device (the motor 14 or the battery 16) other than the fuel cell stack 30 and surplus power generated by the fuel cell stack 30. Alternatively, in the power discarding control, the ECU 26 supplies both the surplus power generated by an external device other than the fuel cell stack 30 and the surplus power generated by the fuel cell stack 30, to the air pump 32. The air pump 32 is driven in a predetermined state by the supplied surplus power to thereby consume the surplus power (discard the power).

When the surplus power is supplied to the air pump 32, the air pump 32 rotates the fan at a rotation speed corresponding to the supplied surplus power. At this time, the supply-side stop valve 110 is in a fully closed state and the bypass valve 116 is in a fully open state. Therefore, the oxygen-containing gas supplied from the air pump 32 to the cathode supply path 92 is discharged from the cathode bypass passage 96 to the outside of the fuel cell system 10 through the discharge path 98.

Further, in step S22, the ECU 26 changes the power command value (AP power command value) of the air pump 32 from the value used during power generation of the fuel cell stack 30 to the power-discarding power command value (AP power-discarding power command value).

The AP power-discarding power command value is set to a value at which regenerative power of the motor 14 or power supplied from the battery 16, which are surplus power generated in the moving body 12, can be suitably consumed, based on an instruction from another ECU. Alternatively, the AP power-discarding power command value is set to a value at which power transiently generated in the fuel cell stack 30 can be suitably consumed, in accordance with the voltage command value (FC voltage command value) of the fuel cell stack 30. The transiently generated power is power occurring when the voltage command value is lowered in order to stop the power generation of the fuel cell stack 30, and is pulse-like power, which rises and then falls.

Further, in step S23, the ECU 26 calculates a power value (AP actual power value) actually consumed by the air pump 32, based on the detection values of the voltmeter 34 and the ammeter 36. Then, the ECU 26 determines whether or not the AP actual power value has reached the AP power command value.

At the same time, the ECU 26 calculates the voltage (FC actual voltage value) of the fuel cell stack 30, based on the detection value of the voltmeter 38. Then, the ECU 26 determines whether or not the FC actual voltage value is equal to or less than the FC voltage command value (i.e., whether the FC actual voltage value the FC voltage command value).

When the AP actual power value of the air pump 32 becomes the AP power command value and the FC actual voltage value of the fuel cell stack 30 becomes equal to or less than the FC voltage command value (step S23: YES), the process proceeds to step S24. In Step S24, the air pump 32 is in a state of consuming the surplus power generated in the moving body 12 (i.e., discarding the surplus power), and the fuel cell stack 30 is in a state of stopping power generation.

Next, in step S25, the ECU 26 inquires of the other ECUs whether or not the AP power-discarding power command value for the air pump 32 has been changed. A situation in which the AP power-discarding power command value is changed is, for example, a case in which the travel control ECU that controls the motor 14 changes the AP power-discarding power command value in accordance with a power generation state of regenerative power of the motor 14. Another situation is a case where the battery ECU changes the AP power-discarding power command value according to the remaining battery level of the battery 16.

Alternatively, the ECU 26 itself may grasp the power generation state or the remaining battery level of external devices (the motor 14 or the battery 16) other than the fuel cell system 10, based on signals from various sensors mounted on the moving body 12. Then, the ECU 26 may change the AP power-discarding power command value in accordance with the power generation state or the remaining battery level. In addition, the ECU 26 may change the AP power-discarding power command value in accordance with a reduction in the FC voltage command value for the fuel cell stack 30.

When the AP power-discarding power command value is changed in step S25 (step S25: YES), the ECU 26 changes the AP power command value to the changed AP power-discarding power command value in step S26.

Next, in step S27, the ECU 26 inquires of the other ECUs whether or not the AP power discarding request has been withdrawn. While the AP power discarding request is not withdrawn (step S27: NO), the above steps S24 to S27 are repeated. As a result, the surplus power in the moving body 12 can be suitably consumed (discarded) by driving the air pump 32, while the power generation of the fuel cell stack 30 is stopped.

If the ECU 26 receives the withdrawal of the AP power discarding request, from another ECU in step S27 (step S27: YES), the ECU 26 lowers the AP power command value in step S28. The ECU 26 sets the lowered AP power command value to a value smaller than the AP power command value used during the normal power generation of the fuel cell stack 30. In the present embodiment, the air pump 32 is of shaft-levitation type. For this reason, the ECU 26 sets the lowered AP power command value to a small value but large enough for the fan of the air pump 32 to rotate and thereby levitate. When the air pump 32 is of shaft-non-levitation type, the ECU 26 may set the lowered AP power command value to 0 and stop the rotation of the air pump 32.

Next, in step S29, the ECU 26 determines whether or not the electric power value actually consumed by the air pump 32 (the AP actual power value) has become the lowered AP power command value. When the AP actual power value becomes the AP power command value (step S29: YES), the ECU 26 ends the power discarding control in step S30.

When the power discarding control is finished, the process returns to the flowchart of FIG. 2. In step S7, the ECU 26 continues the FC power generation stop control.

Next, in step S8, the ECU 26 inquires of the other ECUs whether or not the FC power generation stop request has been withdrawn. While the FC power generation stop request is not withdrawn (step S8: NO), the above step S5 to step S8 are repeated.

In step S8, when the ECU 26 receives the withdrawal of the FC power generation stop request from another ECU (step S8: YES), the process proceeds to step S9.

In step S9, the ECU 26 acquires the measurement result from the air flow sensor 102. Then, the ECU 26 determines whether or not the flow rate of air output from the air pump 32 to the cathode supply path 92 is equal to or less than a predetermined value (i.e., whether the flow rate of air output from the air pump the predetermined value or not).

In step S9, the ECU 26 may make the above determination, based on the power value actually consumed by the air pump 32 (AP actual power value) or the driving state of the air pump 32, instead of the flow rate of air output from the air pump 32. For example, the ECU 26 may determine whether or not the electric power value actually consumed by the air pump 32 (AP actual power value) is equal to or less than a predetermined value. Alternatively, the ECU 26 may acquire the rotation speed of the air pump 32 as the driving state of the air pump 32 from an air pump rotation speed sensor (not shown) and determine whether or not the detected rotation speed of the air pump 32 is equal to or less than a predetermined value.

In step S9, when the ECU 26 determines that the flow rate of the air output from the air pump 32 is greater than the predetermined value (step S9: NO), the ECU 26 waits until the flow rate of the air output from the air pump 32 becomes equal to or less than the predetermined value.

In step S9, when the ECU 26 determines that the flow rate of the air output from the air pump 32 is equal to or less than the predetermined value (step S9: YES), the process proceeds to step S10.

In step S10, the ECU 26 permits the supply-side stop valve (stop IN valve) 110 to be opened. Thus, a large amount of oxygen-containing gas (air) is prevented from being supplied to the fuel cell stack 30 immediately after the end of the power discarding control. As a result, the fuel cell stack 30 can be prevented from being dried.

Next, the process proceeds to step S11, and the ECU 26 ends the power generation stop control (FC power generation stop control). In step S12, the ECU 26 performs a return process for returning from the power generation stop control and a power generation resuming process (FC power generation resuming process) of the fuel cell stack 30. When the start-up of the fuel cell stack 30 is completed in step S13, the fuel cell stack 30 resumes power generation.

The fuel cell system 10 according to the present embodiment basically operates as described above. Hereinafter, an example of a case where the fuel cell system 10 performs both the power generation stop control and the power discarding control will be described with reference to the timing chart of FIG. 4.

Here, a state (normal power generation state) in which the fuel cell system 10 is generating power while the moving body 12 is in operation will be described as an initial state.

First, in the normal power generation state of the fuel cell system 10, the ECU 26 of the fuel cell system 10 receives a request for setting the generation power of the fuel cell stack 30 to 0 [kW], from another ECU mounted on the moving body 12 (time point t1). In other words, the ECU 26 receives the FC power command value of 0 [kW].

The request received by the ECU 26 is not limited to the request for setting the generation power of the fuel cell stack 30 to 0 [kW] (FC power designated value=0 [kW]). For example, the ECU 26 may receive a flag for stopping the generation power, from another ECU mounted on the moving body 12.

Further, the ECU 26 receives a request (AP power discarding request) for causing the air pump 32 to consume the surplus power generated in the moving body 12, from another ECU mounted on the moving body 12.

Immediately after receiving the FC power command value and the AP power discarding request, the ECU 26 receives a signal (FC power generation stop request) requesting stopping of power generation of the fuel cell stack 30, from another ECU (time point t1). In other words, the signal requesting to stop the power generation of the fuel cell stack 30 (FC power generation stop request) is turned on.

Upon receiving the FC power generation stop request, the ECU 26 starts power generation stop control (FC power generation stop control) of the fuel cell stack 30.

At time point t1, the ECU 26 instructs the supply-side stop valve 110 of the cathode supply path 92 to be fully closed (opening degree: 0%). As shown in FIG. 4, the ECU 26 reduces the opening degree of the supply-side stop valve 110 toward the fully closed state over time. Further, at the time point t1, the ECU 26 instructs the discharge-side stop valve 114 of the cathode discharge path 94 to be fully closed (opening degree: 0%). Further, the ECU 26 instructs the bypass valve 116 of the cathode bypass passage 96 to be fully opened (opening degree: 100%).

With the start of the power generation stop control (FC power generation stop control), the ECU 26 lowers the generation power (FC generation power value) of the fuel cell stack 30 to around 0 [kW].

In addition, the ECU 26 lowers the AP power command value to around zero in order to stop driving of the air pump 32. In the present embodiment, the air pump 32 is of shaft-levitation type (air bearing type). Therefore, the ECU 26 does not need to completely stop the driving of the air pump 32. That is, the ECU 26 may lower the rotation speed of the air pump 32 to the minimum rotation speed at which the levitation state of the fan can be maintained. As a result, the ECU 26 can keep the air pump 32 in the standby state, and the air pump 32 can resume supply of air promptly.

Further, at the time point t2, the ECU 26 starts to decrease the voltage command value (FC voltage command value) of the fuel cell stack 30. As the FC voltage command value is lowered, the voltage of the fuel cell stack 30 (FC actual voltage value) is lowered.

When the ECU 26 detects that the opening degree of the supply-side stop valve (stop IN valve) 110 has reached the fully closed state (opening degree: 0%) (time point t2), the ECU 26 checks whether or not an AP power discarding request has been received from another ECU mounted on the moving body 12.

In the example shown in the time chart of FIG. 4, the ECU 26 receives the AP power discarding request. In addition, the AP power discarding request is not withdrawn. Therefore, at the time point t2, the ECU 26 switches the power command value (AP power command value) of the air pump 32 to the power-discarding power command value (AP power-discarding power command value).

The AP power command value is increased from the time point t2 to the time point t3 and reaches the AP power-discarding power command value. At this time, the fuel cell system 10 is placed in a state in which the air pump 32 consumes (discards) the surplus power generated in the moving body 12, during stopping of power generation of the fuel cell stack 30. That is, the fuel cell system 10 is in the power generation stop state and the power discarding state.

When another ECU withdraws the AP power discarding request at the time point t4, the ECU 26 lowers the power command value (AP power command value) of the air pump 32. As a result, the AP power command value reaches a value near 0.

Next, at the time point t5, the ECU 26 receives a request for returning the generation power of the fuel cell stack 30 to the normal generation power, from another ECU mounted on the moving body 12. In other words, the ECU 26 receives an FC power command value that is greater than 0 [kW]. At the same time, the signal requesting to stop the power generation of the fuel cell stack 30 (FC power generation stop request) is turned off. Thus, the ECU 26 starts the start-up process of the fuel cell stack 30.

In the start-up process of the fuel cell stack 30, the ECU 26 raises the FC voltage command value. The ECU 26 confirms that the flow rate of the air (oxygen-containing gas) output from the air pump 32 is equal to or less than a predetermined flow rate. After the confirmation, the ECU 26 allows the supply-side stop valve 110 to open. Thus, the fuel cell stack 30 resumes power generation at the time point t6.

Here, dashed lines in FIG. 4 will be described. A dashed line of the FC generation power value, a dashed line of the FC voltage command value, and a dashed line of the FC actual voltage value indicate possible comparative examples. That is, these dashed lines indicate a comparative example in which it is assumed that the FC voltage command value is rapidly lowered within a short time from the time point t2 to the time point t3.

In this comparative example, transient electric power occurs in the fuel cell stack 30 as indicated by the dashed line of the FC generation power value. In other words, pulsed power that rises and then falls occurs.

Also in this comparative example, when the ECU 26 detects the closed state of the supply-side stop valve 110, the AP power command value is switched to the power-discarding power command value (AP power-discarding power command value) (time point t2). That is, at the time point t2, the ECU 26 drives the air pump 32 to start consumption (discarding) of the surplus power. Therefore, when transient electric power occurs in the fuel cell stack 30 after the time point t2, the ECU 26 can supply the transient electric power to the air pump 32. The transient electric power can be consumed (discarded) by driving the air pump 32.

Of the electric power output from the fuel cell stack 30, net electric power used for driving the motor 14 and charging the battery 16 is referred to as NET power. The electric power actually generated by the fuel cell stack 30 is referred to as Gross power. The value of the NET power is a value obtained by subtracting the value of the electric power consumed (discarded) by the air pump 32 from the value of the Gross power.

As described above, when transient electric power occurs in the fuel cell stack 30, the transient electric power can be consumed by driving the air pump 32. Therefore, of the electric power output from the fuel cell stack 30, net electric power (NET power) supplied for driving the motor 14 and charging the battery 16 becomes substantially 0. Therefore, the fuel cell system 10 can quickly shift to the power generation stop state.

When the NET power is calculated, both the electric power consumed (discarded) by the air pump 32 and the electric power used by auxiliary devices other than the air pump 32 (for example, electric power for a 12-volt power source) may be subtracted from the Gross power. In order to simplify the calculation, the electric power (for example, the electric power for the 12-volt power source) used by the auxiliary devices other than the air pump 32 may not be considered. That is, only the electric power consumed (discarded) by the air pump 32 may be subtracted from the Gross power.

The technical concept and effects grasped from the above embodiment will be described below. It should be noted that, for ease of understanding, some of constituent elements are labelled with the reference numerals of those used in the embodiment, but the present invention is not limited to such constituent elements labelled with the reference numerals.

The fuel cell system 10 according to the present invention is provided in a moving body 12. The fuel cell system 10 includes: the fuel cell stack 30; the cathode supply path 92 through which an oxygen-containing gas is supplied to the fuel cell stack; the air pump 32 configured to supply the oxygen-containing gas to the cathode supply path; the stop valve (the supply-side stop valve 110) provided between the air pump and the fuel cell stack in the cathode supply path; and the control device (the ECU 26) configured to execute the first control (power generation stop control) of stopping power generation of the fuel cell stack by closing the stop valve during power generation of the fuel cell stack, and the second control (power discarding control) of discarding surplus power (surplus electric power) generated in the moving body by driving the air pump by the surplus power. When starting to execute the first control and the second control, if the closed state of the stop valve is detected (step S3), the control device drives the air pump in a predetermined state (step S21).

With the above configuration, when the closed state of the stop valve is detected at the time of stopping the power generation of the fuel cell stack, the fuel cell system drives the air pump in the predetermined state and consumes the surplus power of the moving body through driving of the air pump (power-discarding). Owing thereto, for example, even when transient electric power occurs in the fuel cell stack after the supply-side stop valve is closed, surplus electric power of the moving body including such transient electric power can be consumed by the air pump (discarded through the air pump). Thus, the entire moving body including the fuel cell system can be quickly shifted to the power generation stop state.

In the fuel cell system according to the present invention, the surplus power includes electric power generated by an external device (motor 14) other than the fuel cell stack. It is preferable that, when executing the first control and the second control, the control device changes a driving state of the air pump in accordance with a power generation state of the external device (step S26).

With the above configuration, when the power generation of the fuel cell stack is stopped, the fuel cell system changes the driving state of the air pump in accordance with the power generation state of the external device such as the motor 14. Therefore, the surplus electric power of the moving body including the electric power generated from the external device can be consumed by the air pump. Thus, the entire moving body including the fuel cell system can be quickly shifted to the power generation stop state.

Further, in the fuel cell system according to the present invention, the control device controls the output of the fuel cell stack based on the voltage command value when executing the first control. The surplus power includes power transiently output from the fuel cell stack when the voltage command value is lowered. It is preferable that, when executing the first control and the second control, the control device should change a driving state of the air pump in accordance with the voltage command value for the fuel cell stack (step S26).

With the above configuration, the fuel cell system changes the driving state of the air pump in accordance with the voltage command value for the fuel cell stack when stopping the power generation of the fuel cell stack. As a result, for example, even when the voltage command value is rapidly reduced and transient electric power accordingly occurs in the fuel cell stack, surplus electric power including such transient electric power can be consumed by the air pump. Thus, the fuel cell system can be quickly shifted to the power generation stop state.

The fuel cell system according to the present invention further includes the detection device (the air flow sensor 102, the voltmeter 34, the ammeter 36, the air pump rotation speed sensor) that detects the flow rate of the oxygen-containing gas output from the air pump or the output state of the air pump. It is preferable that, when ending the first control and the second control and then shifting the fuel cell stack to a power generation state, the control device should open the stop valve (step S10) if the flow rate of the oxygen-containing gas outputted from the air pump or the output state of the air pump becomes equal to or less than a predetermined value (step S9).

According to such a configuration, the fuel cell system can supply an appropriate amount of oxygen-containing gas to the fuel cell stack when the power generation stop state of the fuel cell stack is ended and the fuel cell stack is then shifted to the power generation state. Therefore, it is possible to prevent an excessive and large amount of oxygen-containing gas from being supplied to the fuel cell stack. As a result, drying of the fuel cell stack can be prevented.

The method for stopping power generation of the fuel cell system 10 according to the present invention is the power generation stop method for the fuel cell system provided in the moving body 12. The fuel cell system includes: the fuel cell stack 30; the cathode supply path 92 through which an oxygen-containing gas is supplied to the fuel cell stack; the air pump 32 configured to supply the oxygen-containing gas to the cathode supply path; and the stop valve (the supply-side stop valve 110) provided between the air pump and the fuel cell stack in the cathode supply path. The method includes: a first step (step S2) of causing the stop valve to be closed during power generation of the fuel cell stack; a second step (step S3) of detecting a closed state of the stop valve after the first step; and a third step (step S21) of driving the air pump in a predetermined state by surplus power (surplus electric power) generated in the moving body after the closed state of the stop valve is detected in the second step.

With the above configuration, when the closed state of the stop valve is detected at the time of stopping the power generation of the fuel cell stack, the fuel cell system drives the air pump in the predetermined state and consumes the surplus power of the moving body through driving of the air pump (power-discarding). Owing thereto, for example, even when transient electric power occurs in the fuel cell stack after the supply-side stop valve is closed, surplus electric power of the moving body including such transient electric power can be consumed by the air pump (discarded through the air pump). Thus, the entire moving body including the fuel cell system can be quickly shifted to the power generation stop state.

The present invention is not limited to the above disclosure, and various modifications are possible without departing from the essence and gist of the present invention.

What is claimed is:

1. A fuel cell system provided in a moving body, the fuel cell system comprising:

a fuel cell stack;

a cathode supply path through which an oxygen-containing gas is supplied to the fuel cell stack;

an air pump configured to supply the oxygen-containing gas to the cathode supply path;

a stop valve provided between the air pump and the fuel cell stack in the cathode supply path;

a discharge path through which the oxygen-containing gas discharged from the fuel cell stack is discharged to an outside of the fuel cell system;

a cathode bypass passage through which the oxygen-containing gas supplied to the fuel cell stack flows from an upstream side of the stop valve to the discharge;

a bypass valve provided in the cathode bypass passage between the cathode supply path and the discharge path; and one or more processors that execute computer-executable instructions stored in a memory, wherein the one or more processors execute the computer-executable instructions to cause the fuel cell system to:

execute a first control of stopping power generation of the fuel cell stack by closing the stop valve during power generation of the fuel cell stack and opening the bypass valve, and execute a second control, subsequent to the first control step, of discarding surplus electric power generated in the fuel cell stack by driving the air pump by the surplus electric power, wherein, the execution of the first control includes:
detecting that a plurality of conditions are true, the plurality of conditions including:
a signal indicating a fuel cell power command value of 0 [kW] is received,
a signal requesting stopping of power generation of the fuel cell stack is received, and
a closed state of the stop valve is detected during execution of the first control, and
starting execution of the second control in order to drive the air pump in a predetermined state upon the detection that the plurality of conditions are true, and
the execution of the second control includes:
increasing a power command value of the air pump to a value at which the surplus electric power generated in the fuel cell stack is allowed to be discarded, and
subsequent to the increasing of the power command value of the air pump, reducing a voltage command value of the fuel cell stack to a predetermined value.

2. The fuel cell system according to claim 1, wherein,
the surplus electric power includes electric power generated by an external device other than the fuel cell stack, and
when executing the second control, the one or more processors cause the fuel cell system to change a driving state of the air pump in accordance with a power generation state of the external device.

3. The fuel cell system according to claim 1, wherein
the surplus electric power includes electric power that is transiently output from the fuel cell stack when the voltage command value is lowered, and
when executing the second control, the one or more processors cause the fuel cell system to change a driving state of the air pump in accordance with the voltage command value for the fuel cell stack.

4. The fuel cell system according to claim 2, wherein
the surplus electric power includes electric power that is transiently output from the fuel cell stack when the voltage command value is lowered, and
when executing the second control, the one or more processors cause the fuel cell system to change a driving state of the air pump in accordance with the voltage command value for the fuel cell stack.

5. The fuel cell system according to claim 1, further comprising:
a detection device configured to detect a flow rate of the oxygen-containing gas output from the air pump or an output state of the air pump,
wherein, when ending the first control and the second control and then shifting the fuel cell stack to a power generation state, the one or more processors cause the fuel cell system to open the stop valve if the flow rate of the oxygen-containing gas outputted from the air pump or the output state of the air pump becomes equal to or less than a predetermined value.

6. The fuel cell system according to claim 2, further comprising:
a detection device configured to detect a flow rate of the oxygen-containing gas output from the air pump or an output state of the air pump,
wherein, when ending the first control and the second control and then shifting the fuel cell stack to a power generation state, the one or more processors cause the fuel cell system to open the stop valve if the flow rate of the oxygen-containing gas outputted from the air pump or the output state of the air pump becomes equal to or less than a predetermined value.

7. The fuel cell system according to claim 3, further comprising:
a detection device configured to detect a flow rate of the oxygen-containing gas output from the air pump or an output state of the air pump,
wherein, when ending the first control and the second control and then shifting the fuel cell stack to a power generation state, the one or more processors cause the fuel cell system to open the stop valve if the flow rate of the oxygen-containing gas outputted from the air pump or the output state of the air pump becomes equal to or less than a predetermined value.

8. A method for stopping power generation of a fuel cell system provided in a moving body, wherein
the fuel cell system includes:
a fuel cell stack;
a cathode supply path through which an oxygen-containing gas is supplied to the fuel cell stack;
an air pump configured to supply the oxygen-containing gas to the cathode supply path;
a discharge path through which the oxygen-containing gas discharged from the fuel cell stack is discharged to an outside of the fuel cell system;
a cathode bypass passage through which the oxygen-containing gas supplied to the fuel cell stack flows from an upstream side of the stop valve to the discharge;
a bypass valve provided in the cathode bypass passage between the cathode supply path and the discharge path; and
a stop valve provided between the air pump and the fuel cell stack in the cathode supply path,
the method comprising:
causing the stop valve to be closed and causing the bypass valve to be opened during power generation of the fuel cell stack;
detecting that a plurality of conditions are true, the plurality of conditions including:
a signal indicating a fuel cell power command value of 0 [kW] is received,
a signal requesting stopping of power generation of the fuel cell stack is received, and
a closed state of the stop valve is detected after the stop valve is closed; and
upon the detection that the plurality of conditions are true, driving the air pump in a predetermined state by surplus electric power generated in the fuel cell stack
in the driving the air pump in the predetermined state:
increasing a power command value of the air pump to a value at which the surplus electric power generated in the fuel cell stack is allowed to be discarded, and
subsequent to the increasing of the power command value of the air pump, reducing a voltage command value of the fuel cell stack to a predetermined value.

* * * * *